2,881,054

RECOVERY OF CHLORINE

Robert S. Karpiuk, Midland, Mich., assignor to The Dow Chemical Company, Midland, Mich., a corporation of Delaware No Drawing. Application April 10, 1957
Serial No. 651,805

13 Claims. (Cl. 23—219)

This invention relates to a process for the removal and recovery of chlorine from a gas mixture containing chlorine, and more particularly, to the removal and recovery of chlorine by the reaction of the chlorine with a dichloroiodide compound.

In many industrial operations a waste gas containing a small but significant amount of chlorine is produced. It is desirable to recover this small amount of chlorine not only for economical reasons but also for the elimination of air pollution. Numerous processes have been described in which attempts to recover the chlorine have been made by absorption or by the reaction of the chlorine with a particular substance. Using these prior art processes, only a partial recovery of the chlorine is obtained. After treatment of the waste gas, the treated gas discharged will contain small amounts of chlorine. Thus, while these processes will remove a high percentage of the chlorine from gas mixtures containing a considerable amount of chlorine, they are relatively ineffective for very dilute gas mixtures.

It is, therefore, the principal object of this invention to provide a process which would substantially completely remove all chlorine from a gas mixture. A further object is to provide a process whereby the chlorine, once removed from the gas mixture, may be recovered in a relatively pure and concentrated state. Other objects will become apparent hereinafter.

The above and additional objects are accomplished by dissolving a dichloroiodide compound in an acid medium to obtain a dischloroiodide solution containing dichloroiodide anions and contacting the gas mixture containing chlorine with the dichloroiodide solution, thereby reacting the chlorine with the dichloroiodide anions to form tetrachloroiodide anions. The solution containing the tetrachloroiodide anions is then heated to a temperature above the decomposition temperature of the tetrachloroiodide anions to decompose the tetrachloroiodide to the original dichloroiodide anions and chlorine.

Chlorine reacts readily with the dichloroiodide anions to the extent that substantially complete removal of the chlorine is effected from a gas mixture. It is immaterial whether the gas mixture contains a high percentage of chlorine or relatively small amounts. After the mixture is contacted by the usual methods employed in liquid-gas reactions, no chlorine is detected in the treated gas. Most of the waste gas streams, such as, for example, the waste gas from magnesium chloride electrolytic cells, contain hydrogen chloride and other impurities which are inert to and do not adversely affect the dichloroiodide or tetrachloroiodide anions. Thus, the instant process may be used for the recovery of chlorine from these mixtures.

Actually, the reaction effected in the process is with the anions only and may be represented by the following equation:

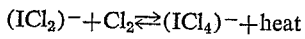

Since the reaction is between the anions only, the cation of the dichloroiodide compound used is relatively immaterial. Thus, all dichloroiodide compounds which are soluble in acid solutions and can be ionized may be used. Illustrative examples of these dichloroiodide compounds are dichloroiodides of alkali metals, such as sodium, potassium, lithium, and cesium; alkaline earth meals, such as magnesium, calcium, strontium, and barium; transition metals, such as manganese, cobalt, and nickel; ammonium, and hydrogen.

Of the dichloroiodides, hydrogen dichloroiodide is preferred due to the stability and solubility of the hydrogen dichloroiodide and the corresponding hydrogen tetrachloroiodide. Many of the tetrachloroiodide compounds other than hydrogen tetrachloroiodide are solids, and their solubilities are less than the corresponding dichloroiodides. Thus, while the above equation shows the tetrachloroiodide anion to be the only product it is possible to obtain a precipitate of the tetrachloroiodide compound in the tetrachloroiodide solution when relatively concentrated solutions and relatively low temperatures are used. The formation of the solid tetrachloroiodide compound does not deleteriously affect the reaction of the chlorine with the dichloroiodide ions, but it is a disadvantage in a continuous system. A slurry is more difficult to pump or handle than a liquid.

Since the dichloroiodide anions and the corresponding tetrachloroiodide anions or compounds are unstable in neutral or alkaline solution, the anions or compounds must be maintained in an acid medium. Any slightly acidic medium which will not react with the dichloroiodide or tetrachloroiodide anions may be used. Aqueous solutions of a mineral acid which do not react with or are not decomposed by chlorine, such as hydrochloric acid, sulfuric acid, and phosphoric acid, having a concentration of at least ½₀ N are generally employed. Hydrochloric acid is preferred not only because it is economical and readily available, but because it assists in preventing hydrolysis of the chloroiodide anions. The concentration of the dichloroiodide compound or the dichloroiodide anions in the acid medium is not critical for the removal of the chlorine. However, when gas mixtures containing a large amount of inerts are used, the stripping effect of the inerts during the contacting operation will result in the loss of di- and tetra-chloroiodides from the mixture. While these iodides may be recovered by use of a caustic absorber, this loss can be decreased by using a dilute solution of the dichloroiodide compounds in concentrated acid solutions. When a hydrogen dichloroiodide concentration of less than 5 moles per liter in concentrated hydrochloric acid is used, the dichloroiodide and tetrachloroiodide loss from the mixture, based upon iodine, is as low as one pound of iodine per ton of chlorine. Under the same conditions in a solution containing initially around 8.5 moles of hydrogen dichloroiodide per liter, the loss may be as high as one pound of iodine for every 13 to 15 pounds of chlorine recovered. Thus, solutions having from 2 to 5 moles of the dichloroiodide compound per liter of solution are preferred.

In contacting the gas mixture containing the chlorine with the dichloroiodide solution, a temperature below the decomposition temperature of the resulting tetrachloroiodide anions or compound formed must be used. Since the tetrachloroiodide anions begin to decompose at an appreciable rate to dichloroiodide anions and chlorine at around 77° C., the temperature is maintained below this value. Generally, a temperature from 0 to 70° C. is employed.

To recover the chlorine, the tetrachloroiodide-containing solution is heated to at least the decomposition temperature of the tetrachloroiodide anions or the tetrachloroiodide compound, but below the decomposition temperature of the dichloroiodide anions or compound. Since the rate of decomposition of the tetrachloroiodide is more rapid at higher temperatures, generally the tetrachloroiodide solution is heated to a temperature of around 90° to 120° C. The decomposition temperatures of the tetrachloroiodide anions or compounds are considerably below the decomposition temperatures of the dichloroiodide anions or compounds, thus permitting a wide range of temperatures which may be used in the recovery of chlorine.

The term "decomposition temperatures," as used herein with respect to a tetrachloroiodide anion or compound, means the temperature at which the tetrachloroiodide will dissociate at an appreciable rate into the corresponding dichloroiodide and chlorine due to the effects of heat under the conditions of the process. When the term is used with respect to a dichloroiodide, it means the temperature at which the dichloroiodide compound or anion will decompose at an appreciable rate to the corresponding iodide compound or anion and chlorine due to heat under the process conditions.

It is apparent that the process may be carried out in a batch or continuous operation. In a continuous process, the gas mixture containing the chlorine is contacted with the dichloroiodide solution. Then the resulting solution or mixture containing the tetrachloroiodide is heated to recover the chlorine in relatively concentrated and pure state, and the dichloroiodide solution recycled to be contacted with additional gas mixture. The usual absorption equipment, such as packed towers, etc. may be used. However, the mixtures and solutions of the dichloroiodide and the tetrachloroiodide compounds are corrosive to the ordinary materials of construction. Thus, zirconium, tantalum, glass or Teflon-lined equipment must be employed.

The following examples further illustrate the invention but are not to be construed as limiting it thereto.

*Example I*

A closed glass tube 12 inches long having a capacity of 500 milliliters and equipped with a sparger located near the bottom of the tube was used as a chlorinator. Two hundred milliliters of a hydrogen dichloroiodide solution containing 4.78 moles of hydrogen dichloroiodide per liter in a concentrated hydrochloric acid solution were placed in the tube. Prior to placing the hydrogen dichloroiodide solution in the tube, it was analyzed for chlorine content by determining the oxidizing equivalent. The analysis consisted of adding a predetermined amount of a saturated potassium iodide solution to a given volume of the hydrogen dichloroiodide solution and titrating the iodine liberated with a 1/10 normal sodium thiosulfate.

A gas mixture containing 3.6 volume percent of chlorine and the balance nitrogen was passed through the sparger and allowed to bubble through the hydrogen dichloroiodide solution. The effluent, or treated gas, leaving the solution was cooled to 0° C., passed through 2 gas absorption bottles, and a wet test meter. The first gas absorption bottle contained a caustic solution having 300 grams of sodium hydroxide per liter of solution, and the second contained a saturated solution of potassium iodide. During the chlorination, approximately a 13 percent increase in liquid volume in the chlorinator was obtained. After the chlorination, the resulting hydrogen tetrachloroiodide solution was analyzed in a manner similar to that described above and found to contain 422 grams per liter of oxidant as chlorine as compared to the original content of 351 grams per liter.

The material in the gas absorption bottles, through which the effluent was passed, was then analyzed for active chlorine and iodine. No chlorine could be detected, but it contained iodine in an amount equivalent to a loss of 0.0017 gram of iodine per cubic foot of nitrogen passed through the hydrogen dichloroiodide solution. This represented approximately a loss of one pound of iodine for every 1920 pounds of chlorine recovered.

The resulting hydrogen tetrachloroiodide solution was dechlorinated in a 3-neck glass flask by heating the solution to boiling in the temperature range of 105° to 110° C. for a period of 10 minutes. The gas leaving the flask was passed through a condenser and through two gas absorption bottles as described above. The contents of the absorption bottles were analyzed for chlorine and iodine. No iodine was detected. The chlorine recovered indicated that 94 percent of the chlorine originally reacted was liberated.

To show the effect of concentration of the hydrogen dichloroiodide in the solution on the loss of iodine by stripping, a series of runs was made in which a gas stream containing a small amount of chlorine was passed through concentrated hydrochloric acid solutions of hydrogen dichloroiodide of various concentrations.

The results obtained are given below:

| Moles of $HICl_2$ per liter of solution | Chlorine conc. in gas mixtures, vol. percent | Pounds of chlorine recovered per pound of iodine loss |
|---|---|---|
| 8.52 | 3.58 | 13.1 |
| 6.90 | 3.20 | 62.5 |
| 6.0 | 4.70 | 325.0 |
| 4.78 | 3.6 | 1,923.0 |

*Example II*

A potassium dichloroiodide solution was used for the reaction of chlorine instead of hydrogen dichloroiodide. The solution was prepared by mixing a saturated solution of potassium chloride and liquid iodine monochloride in amounts such that an equimolar mixture of potassium chloride and pure iodine monochloride was obtained. The mixture was allowed to stand for a week and the solid residue removed by filtration. A sample of the potassium dichloroiodide solution in the amount of 200 milliliters was placed in the chlorinator described in Example I. Relatively pure chlorine was passed into the solution which reacted immediately. An exothermic and substantially complete reaction of the chlorine with the potassium dichloroiodide was obtained.

The recovery of the chlorine from the potassium tetrachloroiodide was effected in the manner described in Example I by heating the solution to a temperature in the range of 90° C. to 120° C.

In a manner similar to that described above, lithium dichloroiodide, sodium dichloroiodide, calcium dichloroiodide, and manganese dichloronodide were prepared. When relatively pure chlorine was passed through each of these dichloroiodides in the presence of hydrochloric acid, substantially complete reaction of the chlorine to form the corresponding tetrachloroiodide was obtained. The decomposition of each of the tetrachloroiodides was effected by heating the tetrachloroiodide to its boiling point which was in the range of 100 to 105° C. In all cases recovery of chlorine was over 97 percent of the chlorine originally reacted.

In a similar manner, the dichloroiodides of cesium, rubidum, magnesium, strongium, barium, cobalt, nickel, etc. may be prepared and substituted for the above dichloroiodides.

It will be apparent from the detailed discussion and the above examples that chlorine may be substantially completely removed from gas mixtures containing chlorine by the instant process. Thus, chlorine may be recovered from gas mixtures containing relatively small amounts of chlorine which was not practical with the prior art processes. In addition to the complete removal of the chlorine from the gas mixture, the chlorine may be readily liberated by decomposing the tetrachloroiodide compounds by heating. Thus, a continuous process may be used in which relatively small amounts of the reactants are necessary. By controlling the concentration of the dichloroiodide compounds in the absorbing solution, the loss of the compound by stripping may be maintained at a negligible amount.

What is claimed is:

1. A process for the removal of chlorine from a gas mixture containing chlorine, which comprises contacting the gas mixture with an acidic dichloroiodide solution to react the dichloroiodide anions with the chlorine to form tetrachloroiodide anions at a temperature below the decomposition temperature of the tetrachloroiodide anions.

2. A process for the recovery of chlorine from a gas mixture containing chlorine, which comprises contacting the gas mixture with an acidic dichloroiodide solution to react the dichloroiodide anions with the chlorine to form tetrachloroiodide anions at a temperature below 77° C., subsequently heating the solution containing the tetrachloroiodide anions to at least the decomposition temperature of the tetrachloroiodide anions and below the decomposition temperature of the dichloroiodide anions to decompose tetrachloroiodide anions to chlorine and dichloroiodide anions, and recovering the chlorine thus liberated by the decomposition.

3. A process for the removal of chlorine from a gas mixture containing chlorine, which comprises dissolving a dichloroiodide compound in an aqueous hydrochloric acid solution having a concentration of at least $\frac{1}{20}$ mole of hydrogen chloride per liter to obtain a dichloroiodide solution containing dichloroiodide anions, contacting the gas mixture with the dichloroiodide solution thereby to react the chlorine with the dichloroiodide anions to form tetrachloroiodide anions at a temperature below the decomposition temperature of the tetrachloroiodide anions.

4. A process for the recovery of chlorine from a gas mixture containing chlorine, which comprises dissolving a dichloroiodide compound in an aqueous hydrochloric acid solution having a concentration of at least $\frac{1}{20}$ mole of hydrogen chloride per liter to obtain a dichloroiodide solution containing dichloroiodide anions, contacting the gas mixture with the dichloroiodide solution thereby to react the chlorine with the dichloroiodide anions to form tetrachloroiodide anions at a temperature below the decomposition of the tetrachloroiodide anions, subsequently heating the solution containing the tetrachloroiodide anions to at least the decomposition temperature of the tetrachloroiodide anions and below the decomposition temperature of the dichloroiodide anions to decompose the tetrachloroiodide anions to chlorine and dichloroiodide anions, and recovering the chlorine thus liberated by the decomposition.

5. A process according to claim 4 wherein the dichloroiodide compound is hydrogen dichloroiodide.

6. A process according to claim 4 wherein the dichloroiodide compound is an alkali metal dichloroiodide.

7. A process according to claim 6 wherein the alkali metal dichloroiodide is potassium dichloroiodide.

8. A process according to claim 6 wherein the alkali metal dichloroiodide is sodium dichloroiodide.

9. A process according to claim 6 wherein the alkali metal dichloroiodide is lithium dichloroiodide.

10. A process according to claim 4 wherein the dichloroiodide is manganese dichloroiodide.

11. A process according to claim 4 wherein the dichloroiodide compound is an alkaline earth metal dichloroiodide.

12. A process according to claim 11 wherein the alkaline earth metal dichloroiodide is calcium dichloroiodide.

13. A process for the recovery of chlorine from a gas mixture containing chlorine, which comprises contacting the mixture with a solution of hydrogen dichloroiodide in concentrated hydrochloric acid solution containing in the range of 2 to 5 moles of hydrogen dichloroiodide per liter of solution at a temperature below 77° C. thereby to react the chlorine in the gas mixture with hydrogen dichloroiodide in the solution to form a hydrogen tetrachloroiodide solution, heating the hydrogen tetrachloroiodide solution at a temperature in the range of 77° to 120° C. to decompose the hydrogen tetrachloroiodide to chlorine and hydrogen dichloroiodide, and recovering the chlorine thus formed by the decomposition of the hydrogen tetrachloroiodide.

References Cited in the file of this patent

Chem. Abstracts, vol. 45, 1951, page 8388, and vol. 49, 1955, page 14552.

Mellor: "Comprehensive Treatise on Inorganic and Theoretical Chemistry," Supp. II, part I, page 506, published by Longmans, Green and Co., New York, N.Y., 1956.